United States Patent
Siu et al.

(10) Patent No.: US 10,893,195 B2
(45) Date of Patent: Jan. 12, 2021

(54) SYSTEMS AND METHODS OF MULTI-SENSOR CAMERAS AND REMOTE IMAGERS

(71) Applicant: Sensormatic Electronics, LLC, Boca Raton, FL (US)

(72) Inventors: Patrick Siu, Tyngsborough, MA (US); Steven Schieltz, Boca Raton, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 16/213,099

(22) Filed: Dec. 7, 2018

(65) Prior Publication Data

US 2020/0186709 A1 Jun. 11, 2020

(51) Int. Cl.
*H04N 7/00* (2011.01)
*H04N 5/232* (2006.01)
*H04N 5/225* (2006.01)
*H04N 5/247* (2006.01)

(52) U.S. Cl.
CPC ..... *H04N 5/23238* (2013.01); *H04N 5/22521* (2018.08); *H04N 5/247* (2013.01)

(58) Field of Classification Search
CPC ........ G06F 3/14; G06F 19/3418; G06F 3/013; G06F 3/048; G06F 3/147; G06F 19/34; G06F 1/206; G06F 21/32; G06F 2203/011; G06F 3/0485; G06F 3/04842; G06F 9/542; G06F 3/012; G06F 3/015; H04B 17/318; H04B 17/373; H04B 17/391; H04N 5/23216; H04N 5/23293

USPC .......................................................... 348/38
See application file for complete search history.

(56) References Cited

U.S. PATENT DOCUMENTS

| | | | |
|---|---|---|---|
| 8,559,802 B1 * | 10/2013 | McClatchie | G03B 15/006 396/13 |
| 2004/0057717 A1 * | 3/2004 | Arbuckle | G08B 13/19632 396/427 |
| 2014/0267586 A1 * | 9/2014 | Aguilar | H04N 5/23238 348/36 |

(Continued)

OTHER PUBLICATIONS

Axis Communications Ad: Modular Cameras, Flexible installation for highly discreet surveillance anywhere; URL: https://www.axis.com/en-us/products/modular-cameras, 2 pages.

(Continued)

*Primary Examiner* — Gims S Philippe
(74) *Attorney, Agent, or Firm* — Foley & Lardner LLP

(57) ABSTRACT

A camera system includes a base including a processing circuit and a communications circuit, a plurality of imagers, and a plurality of connections. The processing circuit is positioned in the base. The plurality of imagers are coupled to the processing circuit via the communications circuit, each imager including a lens and a sensor module that receives light via the lens and outputs a plurality of images based on the received light. The plurality of connections couple each imager to the processing circuit via the communications circuit. Each imager is mounted to an outside surface of the base or spaced from the base, each connection including at least one of a wired connection and a wireless connection. The processing circuit receives the plurality of images from each imager via each respective connection and generates a combined image using the plurality of images.

18 Claims, 4 Drawing Sheets

(56) References Cited

U.S. PATENT DOCUMENTS

| | | | | |
|---|---|---|---|---|
| 2014/0327610 | A1* | 11/2014 | Athavale | H04N 5/7475 345/156 |
| 2016/0065820 | A1* | 3/2016 | Yamamoto | H04N 5/2351 348/151 |
| 2017/0097738 | A1* | 4/2017 | Athavale | G06F 3/0425 |
| 2017/0244934 | A1* | 8/2017 | Chien | H04N 7/181 |
| 2019/0104282 | A1* | 4/2019 | Siu | H04N 7/181 |

OTHER PUBLICATIONS

Axis Communications: FA Series Ad, Flexible, high-performance modular cameras; URL address: https://www.axis.com/en-us/products/axis-fa-series, 4 pages.

* cited by examiner

SYSTEMS AND METHODS OF MULTI-SENSOR CAMERAS AND REMOTE IMAGERS

BACKGROUND

Multi-sensor cameras can include several imagers mechanically mounted in the camera. Each imager can include a lens and sensor module. Multi-sensor cameras can include dome, bullet, biscuit, micro, or Pan, Tilt, and Zoom (PTZ) form factors.

SUMMARY

One implementation of the present disclosure is a camera system. The camera system includes a base including a processing circuit and a communications circuit, a plurality of imagers, and a plurality of connections. The processing circuit is positioned in the base. The plurality of imagers are coupled to the processing circuit via the communications circuit, each imager including a lens and a sensor module that receives light via the lens and outputs a plurality of images based on the received light. The plurality of connections couple each imager to the processing circuit via the communications circuit. Each imager is mounted to an outside surface of the base or spaced from the base, each connection including at least one of a wired connection and a wireless connection. The processing circuit receives the plurality of images from each imager via each respective connection and generates a combined image using the plurality of images.

Another implementation of the present disclosure is a method of operating a camera system. The method includes receiving, by a sensor module of an imager of each of a plurality of imagers, via a lens of the imager, light, each imager mounted to an outside surface of a base or spaced from the base; outputting, by the sensor module, an image based on the received light; providing, by a connection, the image from the imager to a processing circuit, the processing circuit positioned in the base, the connection coupling the imager to the processing circuit via a communications circuit of the base, the connection including at least one of a wired connection and a wireless connection; and generating, by the processing circuit, a combined image using each image received from each respective sensor module.

This summary is illustrative only and is not intended to be in any way limiting.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
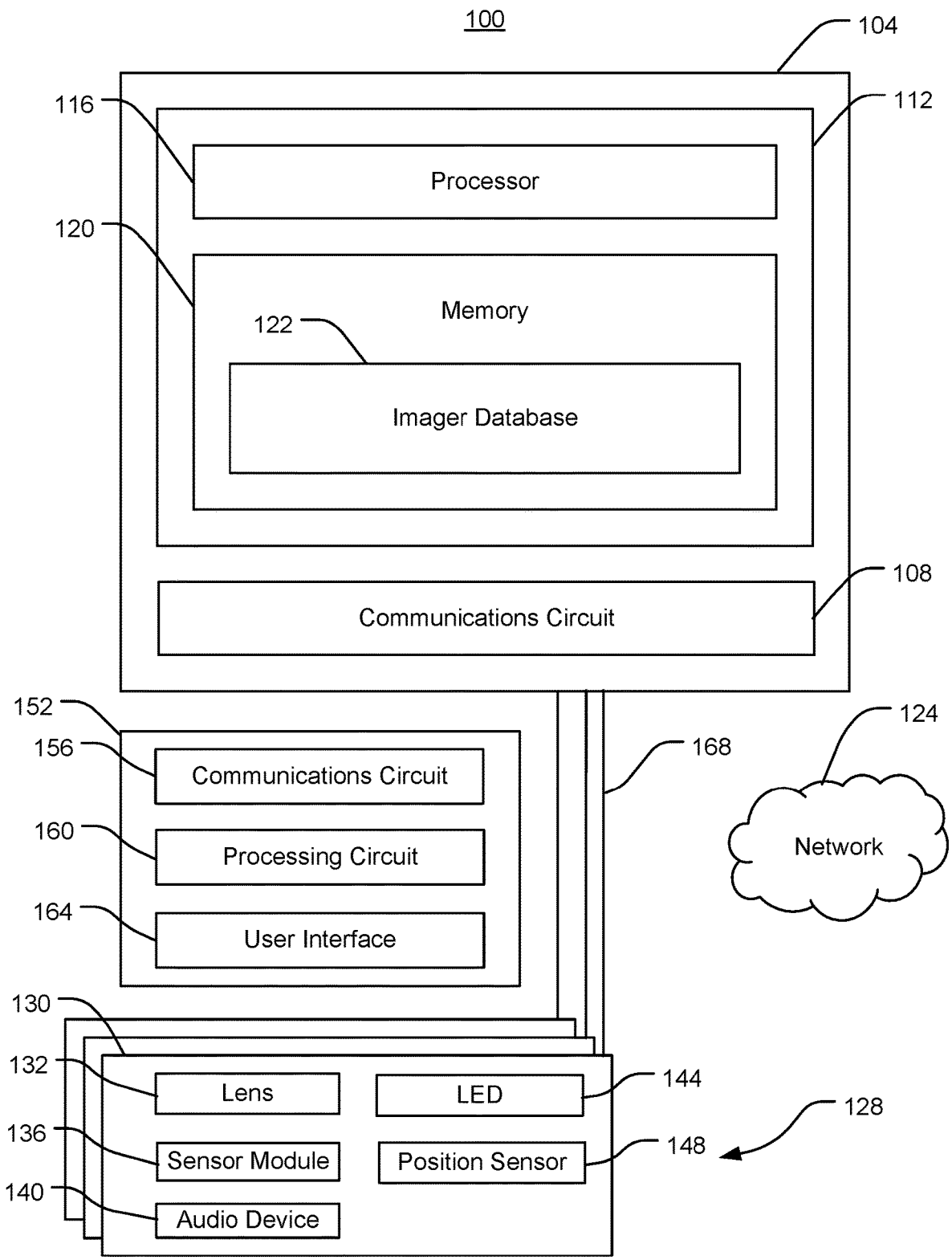
FIG. 1 is a block diagram of a camera system according to an embodiment of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

The present disclosure relates generally to the field of camera systems, and more particularly to systems and methods of multi-sensor cameras and remote imagers. Existing multi-camera systems typically have predetermined form factors, such as dome or bullet/biscuit form factors. As such, the field of view of the camera can be limited to a predetermined field of view, such as 180 degrees, 270 degrees, or 360 degrees, based on how the imagers (lens and sensor modules) of the camera are mechanically mounted in the system. Cameras may be mounted to a wall, ceiling, corner, or dropdown from a ceiling, and the imagers may be positioned in a straight line to provide a panoramic view of a long hallway, but such systems may not be capable of providing field of view around corners, of both sides of a door, of different elevations (such as staircases over multiple floors), or various combinations of such situations. Typically, such limitations on field of view may result from the mechanical connection between the imagers and a system body (e.g., camera base) to which the imagers are mounted.

Systems and methods in accordance with the present disclosure can increase the field of view of multi-sensor cameras while reducing computational burdens and improving heat dissipation. For example, instead of tying the position and orientation of the imager to the camera base processing unit, the imager(s) can be individually connected to the camera base remote by a wired and/or wireless connection. In various such solutions, the imager(s) can be installed remotely from the camera base, such as hundreds of meters away, enabling the multi-sensor camera to cover a field of view of a large area, around corners, and/or at different elevations. In some embodiments, a camera system includes a base including a processing circuit and a communications circuit, a plurality of imagers, and a plurality of connections. The processing circuit is positioned in the base. The plurality of imagers are coupled to the processing circuit via the communications circuit, each imager including a lens and a sensor module that receives light via the lens and outputs a plurality of images based on the received light. The plurality of connections couple each imager to the processing circuit via the communications circuit. Each imager is mounted to an outside surface of the base or spaced from the base, each connection including at least one of a wired connection and a wireless connection. The processing circuit receives the plurality of images from each imager via each respective connection and generates a combined image using the plurality of images.

Referring now to FIG. 1, a camera system 100 is depicted. The camera system 100 includes a base 104 including a communications circuit 108 and a processing circuit 112. The base 104 can enclose the processing circuit 112. The base 104 can be mounted to a wall or ceiling.

The communications circuit 108 can be used to transmit data to and from the processing circuit 112, such as to transmit images and/or status information to a remote entity, and receive commands from the remote entity. The communications circuit 108 can be used to communicate between the processing circuit 112 and imagers 128. The communications circuit 108 can include wired or wireless interfaces (e.g., jacks, antennas, transmitters, receivers, transceivers, wire terminals) for conducting data communications with various systems, devices, or networks. For example, the communications circuit 108 can include an Ethernet card and port for sending and receiving data via an Ethernet-based communications network. The communications circuit 108 can include a wireless transceiver, such as a WiFi transceiver, for communicating via a wireless communications network. The communications circuit 108 can communicate via local area networks (e.g., a building LAN), wide area networks (e.g., the Internet, a cellular network), and/or conduct direct communications (e.g., NFC, Bluetooth). In some embodiments, the communications circuit 108 can conduct wired and/or wireless communications. For example, the communications circuit 108 can include one or more wireless transceivers (e.g., a Wi-Fi transceiver, a Bluetooth transceiver, a NFC transceiver, a cellular transceiver). The communications circuit 108 can communicate using various wired and/or wireless communications methods described below with respect to receiving data from imagers 128. In some embodiments, the processing circuit 112 communicates with a remote network 124 (e.g., an internet protocol network) using the communications circuit 108.

The processing circuit 112 includes processor 116 and memory 120. Processor 116 can be a general purpose or specific purpose processor, a system on a chip (SOC), an application specific integrated circuit (ASIC), one or more field programmable gate arrays (FPGAs), a group of processing components, or other suitable processing components. Processor 116 can execute computer code or instructions stored in memory 120 or received from other computer readable media (e.g., CDROM, network storage, a remote server, etc.).

Memory 120 can include one or more devices (e.g., memory units, memory devices, storage devices, etc.) for storing data and/or computer code for completing and/or facilitating the various processes described in the present disclosure. Memory 120 can include random access memory (RAM), read-only memory (ROM), hard drive storage, temporary storage, non-volatile memory, flash memory, optical memory, or any other suitable memory for storing software objects and/or computer instructions. Memory 120 can include database components, object code components, script components, or any other type of information structure for supporting the various activities and information structures described in the present disclosure. Memory 120 can be communicably connected to processor 116 via processing circuit 112 and may include computer code for executing (e.g., by processor 116) one or more processes described herein. When processor 116 executes instructions stored in memory 120, processor 116 generally configures the processing circuit 112 to complete such activities.

The camera system 100 includes a plurality of imagers 128. Each imager 128 includes a housing 130 supporting a lens 132 and a sensor module 136 that receives light via the lens 132 and outputs one or more images corresponding to the received light. The imager 128 can have weatherproofing and/or ingress proofing (e.g., to a desired internal protection (IP) rating). The imager 128 can be made vandal resistant (e.g., to a desired impact protection (IK) rating). The imager 128 can be an internet protocol (IP) camera, such as an IP security camera.

Figure 2:
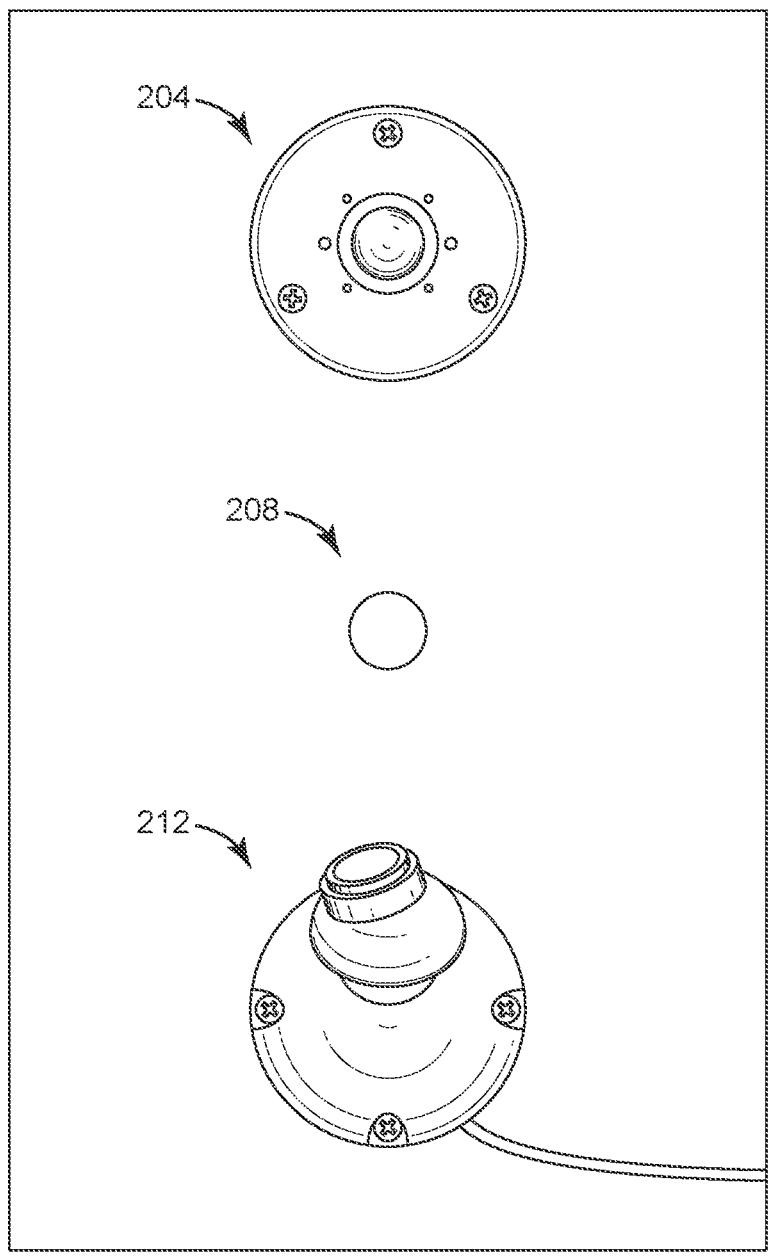
FIG. 2 is a schematic diagram of mounting options including mounting into a surface from the front, mounting into a surface from behind, and surface mounting, which can be used by imagers of the camera system of FIG. 1.

The imager 128 can define a field of view representative of the received light and the one or more images. As the position and/or orientation of the imager 128 changes, the field of view will correspondingly change in position and/or orientation. The lens 132 can include a fixed focal lens, a wide angle lens, a telephoto lens, a manual vari-focal lens, a motorized vari-focal lens, a fisheye lens, or a stereographic lens. The lens 132 can receive a control signal from the processing circuit 112 and modify an operational parameter, such as focus, responsive to the control signal. Referring briefly to FIG. 2, various types of lenses 132 are depicted (e.g., recessed lens 204, covert lens 208, surface lens 212). The imager 128 can have various resolutions, such as from VGA to multi-megapixel resolutions.

In some embodiments, the imager 128 is coupled to an audio device 140. The audio device 140 can include at least one of an audio sensor (e.g., microphone) and an audio output device (e.g., speaker). The audio device 140 can be supported by the housing 130. The audio device 140 can be attached to an outer surface of the housing 130. The audio device 140 can detect audio data, and transmit the audio data to the processing circuit 112. The audio device 140 can output audio signals based on information received from the processing circuit 112. The audio device 140 can output audio signals to perform intercom functions. In some embodiments, the processing circuit 112 selectively provides audio information to each audio device 140 based on a position of the audio device 140.

The imager 128 can include a light-emitting diode (LED) 144. The LED 144 can include at least one of an infrared LED and a laser LED. For example, the LED 144 can be used to illuminate the field of view of the imager 128 under low-light conditions or absolute darkness (e.g., 0 lux conditions).

The imager 128 can include a position sensor 148 that detects at least one of a position and an orientation of the imager 128 and outputs the at least one of the position or the orientation, such as for providing to the processing circuit 112 to enable the processing circuit 112 to combine images from multiple imagers 128. In some embodiments, the imager 128 uses the at least one of the position and the orientation to detect a difference between the orientation and a target orientation (e.g., image orientation aligned with horizon) of the sensor module 136, and rotates the sensor module 136 to reduce the difference. In some embodiments, the position sensor 148 includes an accelerometer, such as a 3-axis accelerometer. In some embodiments, the position sensor 148 includes a GPS/GNSS receiver.

In some embodiments, the position sensor 148 detects a change in the at least one of the position and the orientation that is greater than a threshold change, and outputs an alert responsive to detecting the change to be greater than the threshold change. For example, the position sensor 148 can perform tamper detection, such as by the imager 128 being hit by an object, having a sudden shift in field of view, or being knocked off of a mount, as various such conditions may result in the change in the at least one of position and the orientation.

The processing circuit 112 can perform various functions corresponding to operation of the imagers 128 and image processing of the one or more images received from the imagers 128. In some embodiments, the processing circuit 112 configures the imager 128, such as transmitting a control signal to the imager 128 to cause the imager 128 to control operation of the lens 132 and/or the sensor module 136. The processing circuit 112 can receive status information from the imager 128, and determine a status of the imager 128 based on the received status information.

In some embodiments, the processing circuit 112 performs image quality enhancement of the one or more images. For example, the processing circuit 112 can execute one or more filters to adjust the one or more images received from the imager(s) 128.

The processing circuit 112 can combine images received from multiple imagers 128. For example, the processing circuit 112 can execute image concatenation and/or stitching using the one or more images. In some embodiments, the processing circuit 112 maintains an imager database 122 in memory 120. The imager database 122 can maintain information regarding operation of and position/orientation of each imager 128, such as field of view information of each imager 128. The processing circuit 112 can retrieve the position and/or orientation of each imager 128 from the imager database 122, and combine images from the imagers 128 based on the retrieved position and/or orientation.

The processing circuit 112 can generate video using the one or more images. The processing circuit 112 can generate a sequence of the one or more images (e.g., generate a video stream), and output the sequence to various remote devices, such as client devices 148, using communications circuit 108 and/or the remote network 124. The processing circuit 112 can encode the video stream according to an encoding protocol corresponding to the client device. The processing circuit 112 can execute video analytics of the video stream. The processing circuit 112 can execute audio analytics of audio data received from audio device(s) 140 associated with corresponding imager(s) 128.

In some embodiments, the processing circuit 112 executes access control based on information received from the imager(s) 128. For example, the processing circuit 112 can perform biometric analysis. The processing circuit 112 can execute facial recognition by extracting facial data from the one or more images, comparing the extracted facial data to at least one template, determining the extracted facial data to match the at least one template, and enabling access control responsive to the matched at least one template indicating that a subject corresponding to the facial data has access. In some embodiments, the processing circuit 112 tracks subjects based on information received from the imager(s) 128, such as based on extracted facial data. The processing circuit 112 can track subjects based on gait analysis (e.g., detecting motion of limbs of the subject, comparing the motion to template motions, and determining a match based on the comparison).

Each imager 128 is coupled to the base 104 via a connection 168. The connection 168 can include at least one of a wired connection and a wireless connection. In some embodiments, the connection 168 includes an Ethernet connection, such as a Power over Ethernet (PoE) connection (e.g., IEEE 802.3at Type I). By using PoE, the connection 168 can extend for relatively long distances (e.g., 100 m or more), while providing power to the imager 128 (which can reduce the size and/or weight requirements of the imager 128), though the base 104 may in turn require a larger power draw for supplying power to each imager 128. The PoE connection 168 may have a relatively large per-unit size (e.g., as compared to a micro cable of a transceiver connection described below).

In some embodiments, the connection 168 uses a transceiver, such as a low power transceiver. For example, the connection 168 can include a micro cable providing relatively low DC power (e.g., up to a distance of approximately 8 m). The transceiver connection 168 can provide low power, low heat dissipation, and up to 4K resolution video, while having a relatively small size.

In some embodiments, the connection 168 includes a wireless connection. For example, the base 104 can use the communications circuit 108 to wireless communicate with a corresponding communications circuit (not shown) of the imagers 128. In some embodiments, the communications circuit 108 functions as a wireless access point for the imagers 128. In some embodiments, the imagers 128 and base 104 communicate using a WiFi (e.g., IEEE 802.11g/n/ac) protocol. The imagers 128 can encrypt the one or more images for transmission via the connection 168. In various such embodiments, the imagers 128 can be powered by a local power supply (e.g., battery; DC and/or AC power source separate from the base 104).

In some embodiments, the connection 168 includes a combination of wired and wireless connections. For example, the connection 168 can include a wireless network adapter connecting an interface cable to the respective imager 128 (e.g., if the imager 128 is wired IP camera). The wireless network adapter of the connection 168 can establish a wireless data connection with a wireless access point of the communications circuit 108, and can receive power from a power source to provide to the imager 128. For example, the connection 168 can provide data and power over Ethernet via a PoE connection between the wireless network adapter and the imager 128.

Base Structure

Figure 3:
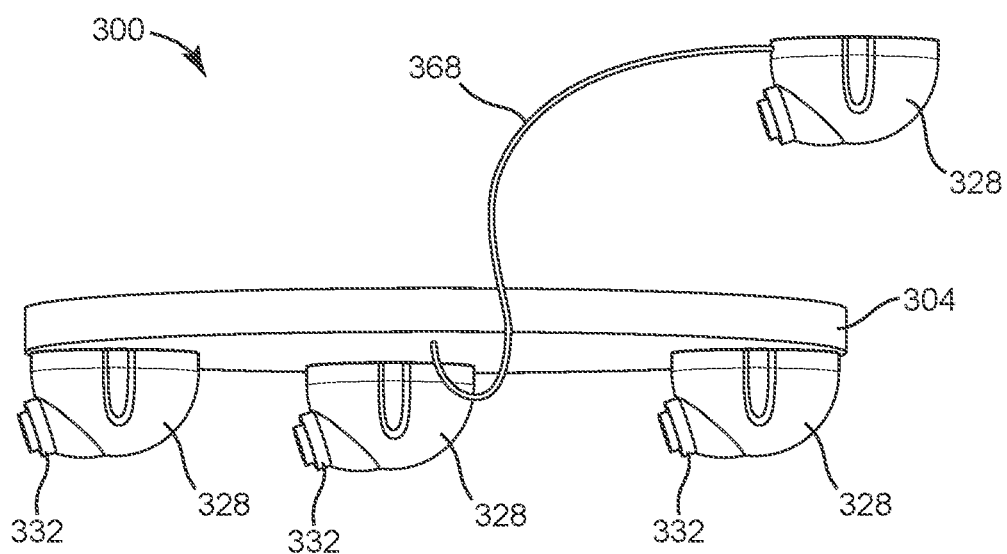
FIG. 3 is a schematic diagram of a camera system according to an embodiment of the present disclosure.

Referring now to FIG. 3, a camera system 300 is depicted. The camera system 300 can incorporate features of the camera system 100 described with reference to FIGS. 1-2. The camera system 300 includes a base 304 coupled to a plurality of imagers 328 via connections 368. FIG. 3 depicts four imagers 328 coupled to the base 304; various numbers of imagers 328 may be coupled to the base 304, depending on factors such as field of view requirements and heat dissipation efficiency. The base 304 can include image processing electronics (e.g., processing circuit 112).

In some embodiments, the imagers 328 are removably attached to the base 304. As such, the imagers 328 can be interchanged to enable the camera system 300 to have a broader range of functionality than if the camera system 300 had a static set of imagers 328 (such as in existing systems with sensors fixedly mounted within an enclosure). For example, the imagers 328 may be interchanged with other imagers 328 having varying resolutions, having specific configurations for day vs. night functionality, and/or having varying lens features such as focal length (enabling different field of view angles).

The base 304 can have a disc shape. The base 304 can have a first surface 336 spaced from a second surface 340 by a thickness 344. The first surface 336 and second surface 340 can be elliptical, which can include being circular. The thickness 344 can be less than a length dimension of the surfaces 336, 340, such as a radius 348 of the first surface 336. The base 304 may be recessed into a ceiling or wall, although this may not be necessary based on the relatively small form factor (e.g., relatively small thickness 344) of the base 304.

In some embodiments, the base 304 has a surface area sufficient to enable relatively high heat dissipation, such that a maximum temperature of electronics of the base 304 is less than a threshold operating temperature (e.g., approximately 50 degrees C. to 60 degrees C.). In existing multi-sensor cameras, electronic components that perform functions such as video compression, IP transmission, and analytics of the high number of megapixels of the sensors can generate heat at a relatively high rate. The heat can cause temperatures of the sensors and other electronic components to increase beyond the threshold operating temperatures, particularly when the sensors and electronic components are housed in a compact, enclosed form factor, such as a relatively spherical dome, biscuit, or bubble, which can add noise to the information outputted by the sensors and potentially reduce a useful lifespan of these components. The present solution can use the geometry of the base 304 to reduce the likelihood that heat generation will add noise to operation of imagers 328 or otherwise interfere with the imagers 328. Separating the imagers 328 from the base 304 can enable improved heat dissipation and lower operating temperature, which can be critical factors in the noise of the sensors of the imagers 328 (e.g., CMOS sensors). In some embodiments, the imager 328 includes an IR illuminator, which can also generate heat at a relatively high rate; by separating the imager 328 from the electronics of the base 304 and improving the heat dissipation of the base 304, the IR illuminator can be driven at relatively high/maximum power without the processing circuit 112 or the sensor module (e.g., sensor module 136) of the imager 328 operating above respective threshold operating temperatures. Separating the IR illuminator from the sensor module 136 of the imager 328, by having separate imagers 328 for the IR illuminator and sensor module 136, can also reduce the impact of heat generation.

In some embodiments, the base 304 can maintain an operating temperature of the processing circuit 112 within a desired operating range (e.g., operating temperature greater than a minimum temperature, such as zero degrees C., and less than the threshold operating temperature) for a desired possible ambient temperature range (e.g., from −17 degrees C. to the threshold operating temperature). For example, the surface area to volume ratio of the base 304 can be selected to greater than a first threshold value that facilitates heat dissipation at relatively high temperatures (e.g., greater than room temperature and less than the threshold operating temperature) and less than a second threshold value that enables heat generated by the electronic components to help keep the temperature of the electronic components within the desired operating range at relatively low temperatures (e.g., from −17 degrees C. to room temperature). In some embodiments, the base 304 includes at least one heating element, such as a resistor, that can be activated to heat the processing circuit 112 and/or imagers 128 responsive to detecting the temperature of the processing circuit 112, imagers 128, and/or ambient temperature to be less than a threshold temperature. For example, the base 304 can include at least one of a first temperature sensor coupled to the processing circuit 112 and a second temperature sensor coupled to a surface of the base 304 to detect a respective temperature, and the processing circuit 112 can control operation of the at least one heating element based on the detected temperature(s).

In some embodiments, the connections 368 include a wire (e.g., cable). The wire may have a length on the order of 10 m to 100 m. In some embodiments, the base 304 includes a storage space (not depicted) to allow an excess length of each respective connection 368 to be stored, such as by allowing the connection 368 to be reeled. As such, the camera system 300 can maintain a relatively small form factor while still providing flexibility as to where the imagers 328 can be positioned.

Figure 4:
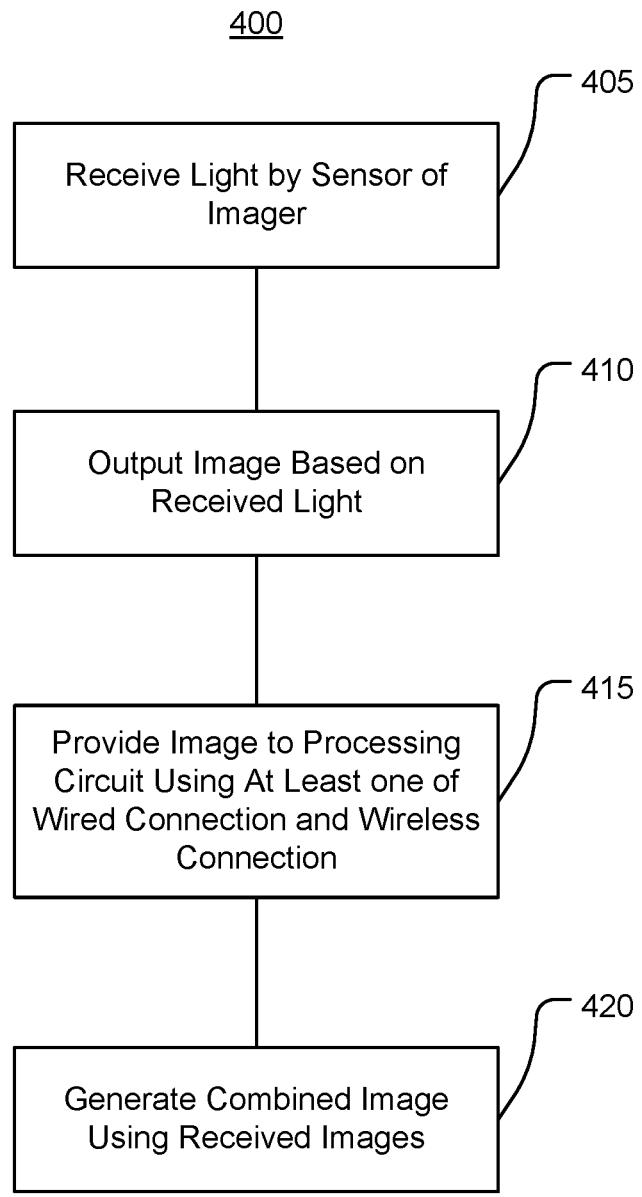
FIG. 4 is a flow diagram of a method of operating a camera system according to an embodiment of the present disclosure.

Referring now to FIG. 4, a method 400 of operating a camera system is depicted. The method 400 can be performed using various camera system described herein, including camera systems 100, 300.

At 405, a sensor module of an imager receives light. The imager can be of a plurality of imagers coupled to a base. For example, the imager can be mounted to the base; the imager can be spaced from the base. The imager can include a lens through which the sensor module receives the light. The imager can have a field of view corresponding to the received light. The imager can receive power from the base and/or from a remote power source. In some embodiments, an LED of the imager is used as an illumination source, such as for illumination in low-light or absolute dark conditions.

At 410, the sensor module outputs an image based on the received light. In some embodiments, the sensor module outputs the image as a raw image file that can be processed by a processing circuit. In some embodiments, the sensor module includes a timestamp of the image with outputted image.

At 415, a connection provides the image from the imager to a processing circuit of the base. The connection can include at least one of a wired connection and a wireless connection. In some embodiments, the connection includes a PoE connection. In some embodiments, the connection includes a wireless adapter that wirelessly communicates data between the imager and the processing circuit using a wireless access point of a communications circuit of the base, and provides power to the imager from a power source.

At 420, the processing circuit generates a combined image using each image received from each respective sensor module. The processing circuit can concatenate and/or stitch images using field of view information (which may be maintain by a database of the processing circuit) as well as position and/or orientation information of each imager. For example, the processing circuit can receive, from a position sensor of each imager, the position and/or orientation of the imager, in order to generate the combined image. In some embodiments, the processing circuit sequentially generates combined images to be outputted to a client device as a video stream. In some embodiments, the position sensor outputs an alert responsive to a change in position of the imager being greater than a threshold change, such as to enable tamper detection. In some embodiments, the processing circuit executes access control using the plurality of images.

In some embodiments, the base can maintain operating temperatures of electronic components of the imagers as well as a processing circuit within desired operating temperature ranges. For example, a temperature sensor coupled to at least one of the processing circuit and the base can detect a temperature, and the processing circuit can control operation of a heating element based on the detected temperature to maintain temperature of the processing circuit above a minimum threshold temperature.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

What is claimed is:

1. A camera system, comprising:
  a base including a processing circuit and a communications circuit, the processing circuit positioned in the base;
  a plurality of imagers coupled to the processing circuit via the communications circuit, each imager including a lens and a sensor module that receives light via the lens and outputs a plurality of images based on the received light; and
  a plurality of connections coupling each imager to the processing circuit via the communications circuit, each imager mounted to an outside surface of the base or spaced from the base, each connection including at least one of a wired connection and a wireless connection, the processing circuit receives the plurality of images from each imager via each respective connection and generates a combined image using the plurality of images, the base has a surface-to-volume ratio greater than a threshold value at which an operating temperature of the processing circuit is less than 60 degrees Celsius while the processing circuit is processing the plurality of images to generate the combined image.

2. The camera system of claim 1, comprising:
  at least one position sensor coupled to a respective imager, the processing circuit receives at least one of a position and an orientation of the respective imager from the at least one position sensor and generates the combined image based on the at least one of the position and the orientation.

3. The camera system of claim 1, comprising:
a position sensor coupled to at least one imager, the position sensor detects a change in position of the at least one imager and outputs an alert responsive to the change being greater than a threshold change.

4. The camera system of claim 1, comprising:
the processing circuit outputs a video stream using a plurality of combined images to a client device.

5. The camera system of claim 1, comprising:
the processing circuit executes access control using the plurality of images.

6. The camera system of claim 1, comprising:
the connection includes a power over Ethernet connection.

7. The camera system of claim 1, comprising:
the connection includes a wireless adapter that wirelessly communicates data between at least one imager and the processing circuit and provides power from a power source to the at least one imager.

8. The camera system of claim 1, comprising:
at least one imager includes a light-emitting diode (LED) as an illumination source.

9. The camera system of claim 1, comprising:
at least one imager includes only an LED as an illumination source.

10. The camera system of claim 1, comprising:
the base includes a storage space that receives a wire of a first connection of the plurality of connections.

11. A method of operating a camera system, comprising:
receiving, by a sensor module of an imager of each of a plurality of imagers, via a lens of the imager, light, each imager mounted to an outside surface of a base or spaced from the base;
outputting, by the sensor module, an image based on the received light;
providing, by a connection, the image from the imager to a processing circuit, the processing circuit positioned in the base, the connection coupling the imager to the processing circuit via a communications circuit of the base, the connection including at least one of a wired connection and a wireless connection;
detecting, by a temperature sensor coupled to at least one of the processing circuit and the base, a temperature;
comparing, by the processing circuit, the detected temperature to a minimum threshold temperature; and
activating, by the processing circuit, a heating element responsive to the detected temperature being less than the minimum threshold temperature; and
generating, by the processing circuit, a combined image using each image received from each respective sensor module.

12. The method of claim 11, comprising:
detecting, by a position sensor, at least one of a position and an orientation of the imager; and
generating, by the processing circuit, the combined image based on the at least one of the position and the orientation.

13. The method of claim 11, comprising:
detecting, by a position sensor coupled to the imager, a change in position of the imager; and
outputting, by the position sensor, an alert responsive to the change being greater than a threshold change.

14. The method of claim 11, comprising:
outputting, by the processing circuit, a video stream using a plurality of combined images to a client device.

15. The method of claim 11, comprising:
providing power, by the connection to the imager, using power over Ethernet.

16. The method of claim 11, comprising:
wirelessly communicating, by a wireless adapter of the connection, data between the imager and the processing circuit; and
providing power, by the wireless adapter to the imager, from a power source.

17. The method of claim 11, comprising:
using an LED of the imager as an illumination source.

18. The method of claim 11, comprising:
performing access control using the plurality of images.

* * * * *